July 23, 1963 S. L. REICHES 3,098,942
MAGNETIC CENTERING DEVICE FOR CATHODE RAY TUBES
Filed Feb. 24, 1955 2 Sheets-Sheet 2
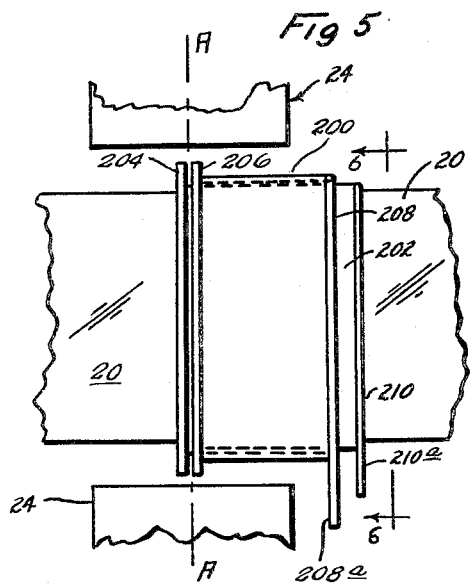
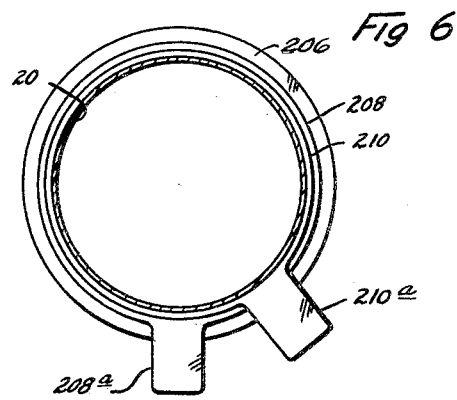
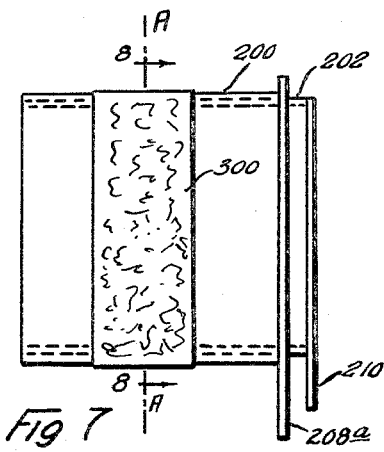
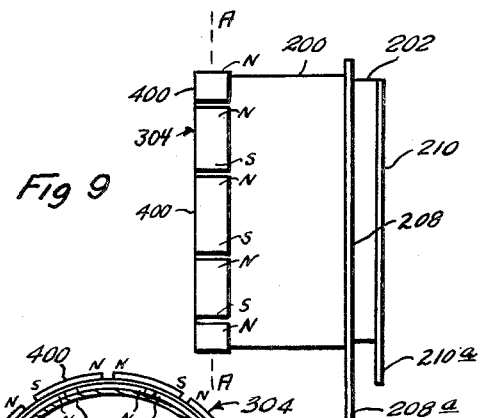
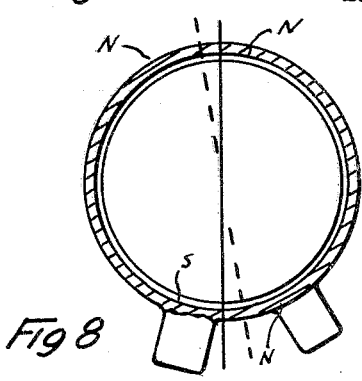
SOL L. REICHES INVENTOR.
BY George E. Frost
ATTORNEY United States Patent Office 3,098,942
Patented July 23, 1963

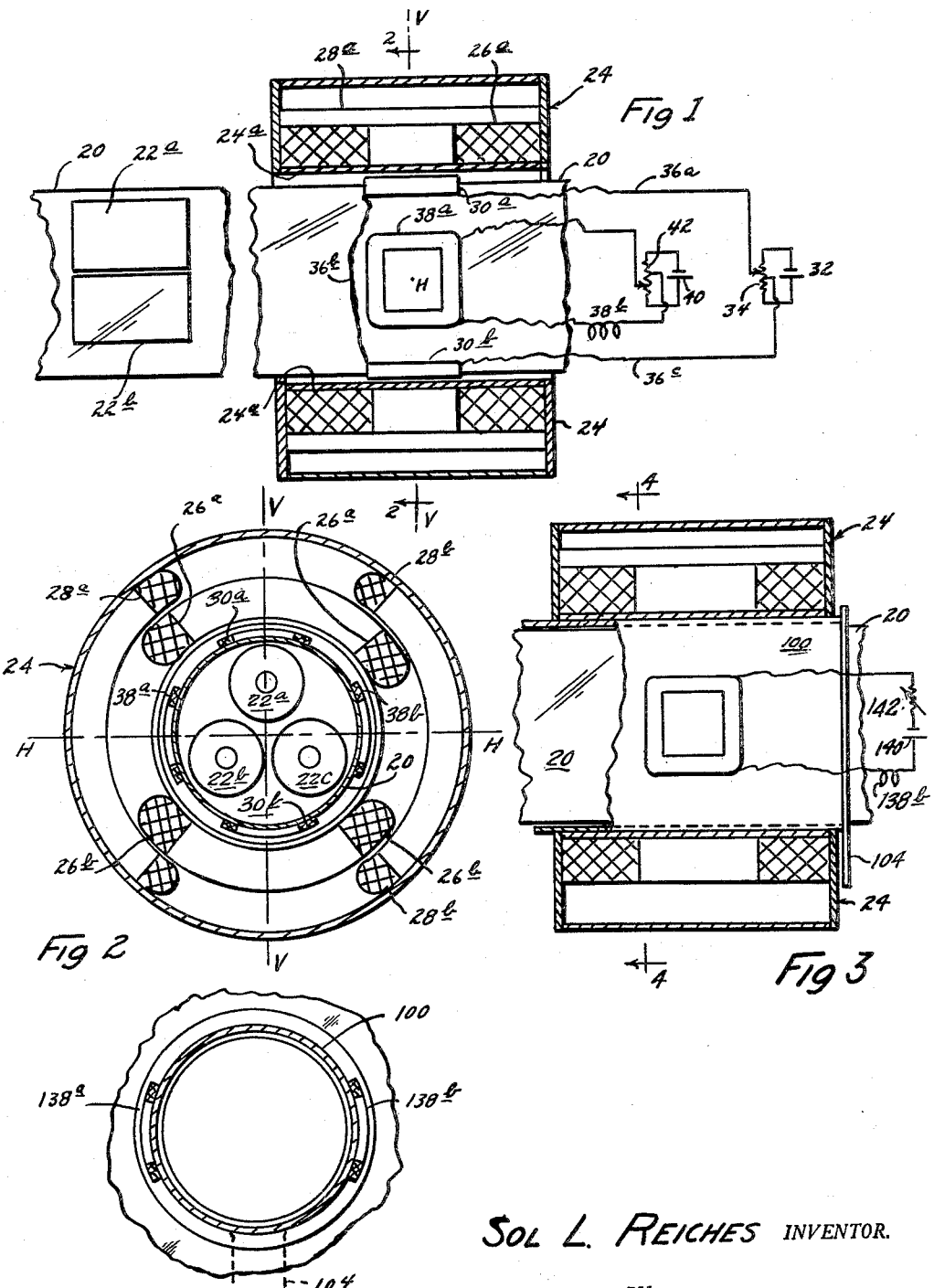

3,098,942
MAGNETIC CENTERING DEVICE FOR
CATHODE RAY TUBES
Sol L. Reiches, Shaker Heights, Ohio, assignor, by mesne assignments, to Zenith Radio Corporation, a corporation of Delaware
Filed Feb. 24, 1955, Ser. No. 490,296
13 Claims. (Cl. 313—77)

The present invention relates to an improved magnetic centering device for cathode ray tubes, such as the three electron gun type tubes used in certain color television receivers. Related hereto are the beam positioning devices described and claim in my copending application Serial No. 684,738, filed September 18, 1957, a continuation-in-part of the present application and assigned to the same assignee.

In three ray beam cathode ray tubes used for color television reproduction, color sensitivity is obtained by reason of the different direction in which the ray beams strike the common viewing screen. Conventional ray beam centering devices produce loss of color purity in such tubes because they act on the respective ray beams at positions on the tube neck which are spaced longitudinally of the deflection coils. To overcome this difficulty efforts have been made to provide D.-C. centering currents in the magnetic deflection coils. Such currents of necessity produce a centering magnetic field which is coincident with the time varying deflection field. However, this mode of providing ray beam centering is comparatively expensive and inefficient and requires alteration of the deflection circuits to inject the necessary controllable D.-C. component in the deflection current.

The present invention provides means independent of the deflection yoke for magnetically positioning the electron beam or beams of a cathode ray tube. In brief, a magnetic field having diametrically opposed poles of adjustable orientation and intensity is generated in alignment or centered relation with respect to the fields of the deflection coils by elements located outside the neck of the cathode ray tube and within the deflection yoke structure. In accordance with various forms of the invention, for example, such field may be produced by fixed windings in physical quadrature relation carrying independently adjustable time-constant currents, by a single such winding rotatably supported, by one or more relatively rotatable magnetized magnetic rings having diametrically opposed poles and of a material which does not give rise to interference with the sweep field, or by similar arrangements of relatively rotatable diametrically disposed magnetic bands formed of numerous electrically independent magnetic elements.

It is therefore a general object of the present invention to provide an improved magnetic ray beam positioning device for cathode ray tubes which is independent of the deflection coils and is positioned in relation to these coils and the neck of the cathode ray tube to provide a field aligned with the deflection field.

One alternate specific object of the present invention is to provide a device of the above type incorporating no moving parts.

A different specific object of the present invention is to provide a permanent magnet ray beam centering device of the above type.

A related specific object of the present invention is to provide a device of the above type wherein permanent magnet means is used without interfering with the ray beam sweep field.

A further object of the present invention is to provide devices of the foregoing type which are inexpensive, reliable, readily adjusted, and easily manufactured to the end that they may be effectively used in home television receivers.

The novel features which I believe to be characteristic of my invention are set forth with particularity in the appended claims. The invention itself, however, together with further objects and advantages thereof, will best be understood by reference to the following description taken in conjunction with the accompanying drawings in which:

FIGURE 1 is a view in partially broken away axial cross-section of the neck portion of a cathode ray tube, a deflection yoke received over the tube, and a magnetic centering device constructed in accordance with the present invention;

FIGURE 2 is a cross-sectional view through axis 2—2 of FIGURE 1;

FIGURE 3 is a fragmentary view like FIGURE 1 but showing an alternative form of the present invention;

FIGURE 4 is a fragmentary cross-sectional view through axis 4—4, FIGURE 3;

FIGURE 5 is a view generally like FIGURE 1 showing a permanent magnet form of the present invention;

FIGURE 6 is a fragmentary cross-sectional view through axis 6—6, FIGURE 5;

FIGURE 7 is a view in side elevation of another permanent magnet form of the present invention;

FIGURE 8 is a cross-sectional view through axis 8—8, FIGURE 7;

FIGURE 9 is a side elevational view of yet another permanent magnet form of the present invention; and FIGURE 10 is a fragmentary view showing how the magnets of FIGURE 9 are magnetized.

Referring now to FIGURE 1, there is shown at 20 the neck portion of a multi-color cathode ray tube. This neck portion consists of a glass tube having at one end a triad of three independent electron guns. These are indicated at 22a, 22b, and 22c, FIGURES 1 and 2. At the end opposite the electron guns 22a, 22b and 22c, the neck 20 of the tube flares to form a generally conical bell portion which terminates in a planar or slightly curved viewing screen (not shown). The phosphor dots (not shown) are disposed on the viewing screen to receive the electron beams from electron guns 22a, 22b, and 22c. A shadow mask (not shown) is positioned adjacent the phosphor coating and between the electron guns and the coating. As is well known in the art, the function of the shadow mask is to shield the electron streams from the phosphor coating so that each electron stream strikes only certain elemental areas of the viewing screen, depending on the direction from which the electrons travel to the viewing screen. The phosphor dots struck by the respective electron beams are made of materials which produce three separate and distinct primary colors. Thus with proper intensity modulation of the respective ray beams to correspond with the color components of a television image, it is possible to reproduce the image in full color.

In operation, the ray beams from the respective electron guns 22a, 22b and 22c are swept in unison horizontally and vertically across the viewing screen. This sweep action is provided by the vertical and horizontal sweep coils, comprising the deflection yoke indicated generally at 24, FIGURE 1. The vertically positioned coils forming the deflection yoke are indicated at 26a and 26b, FIGURE 2. These coils produce a magnetic field along axis V—V, FIGURE 2, to deflect the ray beams in the horizontal direction of axis H—H, FIGURE 2, and thereby cause the cathode ray beam to sweep or "write" in the horizontal direction across the viewing screen. In normal television practice saw tooth currents of about 15.75 kilocycles per second are caused to flow in the coils 26a and 26b to cause the ray beam to make about 15,750 horizontal sweeps per second.

The horizontally disposed deflection coils are indicated at 28a and 28b, FIGURE 2, and produce a magnetic field directed along the horizontal axis H—H, FIGURE 2. This magnetic field deflects the ray beam in the vertical direction to cause the vertical ray beam sweep along axis V—V, FIGURE 2. In normal television practice these coils carry a saw tooth current flow of 60 cycles per second to sweep the ray beam in 60 vertical transverses per second.

In the practical construction of complete color television systems utilizing the above described method of color reproduction, the image as reproduced on the cathode ray viewing screen usually is shifted to some degree from the vertical and horizontal centered position. This error may be due to necessary tolerances in tube construction, tolerances in the position of the deflection yoke in relation to the tube axis, or other factors. In a practical television receiver it is accordingly necessary to provide some means by which the image may be bodily shifted to a centered position in relation to the viewing screen and thereby overcome the effects of such deviations.

In the form of the present invention shown in FIGURES 1 and 2, a pair of small vertically oriented windings 30a and 30b is sandwiched in the space between the inner periphery 24a of the deflection yoke 24 and the outer edge of the neck 20 of the tube. As shown these windings are aligned with the axis V—V of the deflection yoke so that the fields due to windings 30a and 30b are in axially centered relationship with respect to the yoke 24 as seen in FIGURE 1. Unidirectional current flow is created in the coils 30a and 30b by the D.-C. voltage source 32 which acts through the variable series resistance 34 and conductors 36a, 36b and 36c to produce a vertically oriented magnetic field. By adjustment of the resistance 34, it is therefore possible to produce a magnetic field along axis V—V, FIGURES 1 and 2, to cause a time-constant ray beam deflection independent of the sweep current flow. Adjustment of resistance 34 accordingly provides a means of shifting the television image horizontally to center the same in the desired position.

A pair of horizontally oriented windings 38a and 38b, FIGURES 1 and 2, are also sandwiched between the neck 20 of the tube and the deflection yoke 24 to produce a magnetic field along axis H—H, FIGURE 2, in centered relationship with the yoke 24. These windings are likewise connected in series relationship as shown in FIGURE 1 with a voltage source 40 and a variable resistance 42 to provide an adjustable time-constant current flow. This current flow creates a similar time-constant adjustable magnetic field along axis H—H to center the television image in the vertical direction.

Since the windings 30a and 30b, on the one hand, and the windings 38a and 38b, on the other hand, provide independent horizontal and vertical centering adjustment of the television image, it is only necessary to make appropriate adjustments of the unidirectional current flow in the two sets of windings to make any desired overall centering adjustment. Thus, if only vertical shifting movement is necessary the resistance 42 is adjusted. Alternatively, if only horizontal shifting movement is necessary the resistance 34 is adjusted. Any desired combined horizontal and vertical adjustment may be achieved by adjusting both resistances.

In the practical construction of a centering arrangement of the type shown in FIGURES 1 and 2, the windings 30a and 30b, 38a and 38b may be affixed to and supported by the deflection yoke 24 as desired. Alternatively, they may be affixed to the neck 20 of the cathode ray tube by means of a suitable cement. In either event they are positioned in sandwiched relationship with respect to the neck of the tube and the deflection yoke and are in centered relationship with respect to the yoke 24.

In the modified form of the invention shown in FIGURES 3 and 4 only a single pair of centering windings is provided. These are indicated at 138a and 138b, respectively. They are carried by the nonmagnetic sleeve 100 which is telescopically received between the neck 20 of the cathode ray tube and the inner periphery of the deflection yoke 24. The winding 138a and 138b are energized from unidirectional voltage source 140 through the variable resistance 142 to provide a controllable current flow. The sleeve 100 has an end plate 102 defining a handle 104 by which the sleeve—and hence windings 138a and 138b—may be rotated in relation to the tube 20 and yoke 24. In use, the sleeve 100 is rotated until the axis of the windings 138a and 138b are at right angles to the desired direction of centering. The resistance 142 is then adjusted until the desired degree of centering adjustment is obtained. It will be noted that by rotating the sleeve 100 the single set of windings 138a and 138b achieves complete centering action, both as to direction and magnitude.

Since the sleeve 100 is capable of complete rotation about the neck of the tube, the source 140 and resistance 142 may be arranged to cause current flow through the windings 138a and 138b in only one direction. With fixed coils, as in FIGURES 1 and 2, it is generally necessary to adjust the direction as well as the magnitude of the centering current flow.

FIGURES 5 and 6 show still another form of the present invention. In this instance a pair of nonmagnetic sleeves 200 and 202 are provided in telescopic relationship with respect to each other and with respect to the neck 20 of the cathode ray tube. As shown, these sleeves extend within the yoke 24 and carry a pair of end rings 204 and 206 which are in centered relationship with the central plane A—A of the yoke. The end rings 204 and 206 are of magnetic material permanently magnetized to form diametrically opposed poles. They are of like magnetic construction so that the overall magnetic field due to the combined action of these rings is in substantially centered relationship with respect to yoke 24. The magnetic material of which these rings are made has a high coercive force in order that the varying fields due to the deflection currents will not substantially demagnetize them. In addition, the material should have as high a resistivity as possible since in the form of FIGURES 5 and 6 they form short circuited turns in which the deflection field induces voltage and hence current flow. Additionally, the material of the rings 204 and 206 should have permeability as close to unity as possible so that the magnetic coupling of the yoke and the rings is at a minimum.

I have found that the hard ferrites meet the above magnetic requirements. Such materials are marketed under the names Indox, Magnadur and Ferroxdur, and are characterized by a general ability to meet these magnetic requirements. In an actual centering unit, for example, the rings 204 and 206 may have inner diameter about 2⅛ inches, outer diameter of 2½ inches, and axial length of about 0.093 inch. They may be affixed to the sleeves 200 and 202 by cementing or similar means.

As will be evident from FIGURES 5 and 6 the sleeves 200 and 202 extend longitudinally to points outboard of the deflection yoke 24. They there terminate in end rings 208 and 210, the former having an adjusting handle 208a and the latter having an adjusting handle 210a. In order to center the television image, the handles 208a and 210a are rotated in unison until the permanent magnetic field shifts the image in the desired direction and then with respect to each other until the magnitude of the image shift has the desired value to restore the image to centered position.

In the modified form of the invention shown in FIGURES 7 and 8, the sleeves 200 and 202 each have a coating 300 of powdered permanent magnetic material. As shown, the coatings extend entirely around the sleeve. Also as shown in FIGURE 8 the ring defined by each band of magnetic material is magnetized to define diametrically opposed poles. The bands 300 are positioned in centered relation to the deflection yoke and the handles 210a and 208a are positioned outboard the yoke. Centering adjustment is made in the same manner as with the form shown in FIGURES 5 and 6.

The powdered magnetic material forming the bands 300 is carried by an electrical insulating carrier so that the individual particles are electrically insulatd from each other. This avoids current flow paths in which the deflection field sets up current and accordingly permits the use of magnetic material having comparatively low resistance. The permeability of the material, however, should be close to unity and the coercive force should be adequate to withstand the effects of the varying deflection field.

FIGURES 9 and 10 show still another form of the present invention wherein the magnetic ring 304 are formed by separate permanent magnets formed about the sleeves 200 and 202, respectively. As shown, the magnets 400 are bent to the contour of the respective sleeves and are affixed by cementing or similar means to provide diametric opposed magnetic poles without defining a short circuit path for electrical current flow. Adjustment of the centering field with the construction of FIGURE 9 is made in the same way as with the device of FIGURES 5 and 6.

FIGURE 10 shows the way in which the magnets 400 are magnetized to define diametrically opposed poles.

It will be observed that with the constrution of FIGURES 7 and 9 the magnetic rings are individually centered in relation to the center line A—A of the yoke 24. In the construction of FIGURES 5 and 6 the rings 204 and 206 are not individually centered but are in balanced relationship to the line A—A so that the field they create is substantially entered.

With the various constructions of the present invention the television image may be readily centered without causing loss of color purity and in a simple, effective manner. Also the centering of the image is achieved without interfering with the deflection circuits or other portions of the receiver.

It will, of course, be understood that various modifications and alternative constructions may be made without departing from the true spirit and scope of the present invention. I therefore intend by the appended claims to cover all modifications and alternative constructions coming within their true spirit and scope.

What I claim as new and desire to secure by Letters Patent of the United States is:

1. A beam centering device for use in conjunction with a cathode ray beam display apparatus, said display apparatus comprising, a cathode ray beam tube having a neck portion surrounded by an electromagnetic deflection yoke including a plurality of electrical deflection windings, said deflection windings being physically so formed as to define a magnetic deflection center and to provide an axial access opening in said yoke so dimensioned as to freely accept with substantial predetermined clearance the neck of said cathode ray beam tube so as to permit the positioning of said yoke in surrounding relation to said neck with said magnetic deflection center positioned at a predetermined desired point of cathode ray beam deflection influence yet to define a clearance space between portions of said windings and said neck, said beam centering device comprising: adjustable permanent magnet means so dimensioned as to freely enter said clearance space between said windings and said neck, said means comprising a structure of magnetic material having a permeability of the same order of magnitude as that of air so as to minimize distortion of the magnetic field distribution otherwise provided by said deflection windings, said permanent magnet means being so permanently magnetized as to maintain a substantial magnetic potential and resulting flow of magnetic flux along a path transverse to the axis of said deflection yoke access opening, said permanent magnet means being positionable in the immediate vicinity of said magnetic deflection center within said yoke to cause a static displacement of the cathode ray within said cathode ray beam display apparatus.

2. A beam centering device for use in conjunction with a cathode ray beam display apparatus, said display apparatus comprising, a cathode ray beam tube having a neck portion surrounded by an electromagnetic deflection yoke which includes a plurality of electrical deflection windings, said deflection windings being physically so formed as to define a magnetic deflection center and to provide an axial access opening in said yoke so dimensioned as to freely accept with substantially predetermined clearance the neck of said cathode ray beam tube so as to permit positioning of said yoke in surrounding relation to said neck with said magnetic deflection center positioned at a predetermined desired point of cathode ray beam deflection influence yet to define a clearance space between a portion of said windings and said neck, said beam centering device comprising: a first and second permanent magnet member so dimensioned as to freely enter said clearance space between said windings and said neck, each of said members comprising a structure of magnetic material having a permeability of the same order of magnitude as that of air so as to minimize distortion of the flux pattern otherwise produced by said electrical deflection windings when excited with electrical deflection current, each permanent magnet member being so permanently magnetized as to sustain a substantial magnetic potential and resulting flow of magnetic flux along a path transverse to the axis of said deflection yoke access opening, said members being placed immediately next to one another within said clearance space and in the vicinity of said magnetic deflection center defined by said windings to cause vectorial addition of the individual magnetic potentials sustained by each member to yield a resultant beam centering flux flow effective in the vicinity of said deflection center, said members being further so conformed in relation to said yoke as to permit the relative adjustment of each with respect to said yoke and one another along circumferential paths substantially concentric with respect to the axis of said access opening.

3. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:

means, including a static field producing element receivable in said space substantially at said deflection center, for creating a static magnetic field oriented generally transverse to and rotatable about the axis of said neck, said element being of a material having substantially unity permeability and maintaining a preselected strength of said static field in the presence of an operating deflection yoke field.

4. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:

a ring shaped magnet receivable in said space substantially at said deflection center and disposed and rotatable about the axis of said neck, said magnet creating a static field oriented generally transverse to its axis of rotation and being of a material having substantially unity permeability and a coercive force of sufficiently high value to maintain a preselected strength of said static field in the presence of an operating deflection yoke field.

5. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  a pair of ring-shaped magnets each receivable in said space substantially at said deflection center and disposed and independently rotatable about the axis of said neck, said magnets each creating a static field oriented generally transverse to their axis of rotation and being of a material having substantially unity permeability and a coercive force of sufficiently high value to maintain a preselected strength of said static field in the presence of an operating deflection yoke field.

6. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  a pair of ring-shaped magnets each receivable in said space substantially at deflection center and disposed and independently rotatable about the axis of said neck, said magnets each creating a static field oriented generally transverse to their axis of rotation and being of a material having substantially unity permeability, a coercive force of sufficiently high value to maintain a preselected strength of said static field in the presence of an operating deflection yoke field, and a resistivity of sufficiently high value to minimize current flow induced by said yoke field.

7. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  a pair of concentric sleeves positioned and independently rotatable around said neck partially within said yoke;
  and a pair of ring-shaped magnets secured respectively to the innermost end portions of said sleeves and receivable in said space substantially at said deflection center, said magnets each creating a static field oriented generally transverse to their axis of rotation and being of a material having substantially unity permeability and a coercive force of sufficiently high value to maintain a preselected strength of said static field in the presence of an operating deflection yoke field.

8. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  a ring shaped member receivable in said space substantially at said deflection center and disposed and rotatable about the axis of said neck;
  and a multiplicity of mutually spaced magnetic elements disposed on said member and together creating a static field oriented generally transverse to the axis of rotation of said member with said elements being of a material having substantially unity permeability and a coercive force of sufficiently high value to maintain a preselected strength of said static field in the presence of an operating deflection yoke field.

9. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  a ring shaped member receivable in said space substantially at said deflection center and disposed and rotatable about the axis of said neck and including a plurality of magnetic segments spaced end to end circumferentially around said member, said magnetic segments together creating a static field oriented generally transverse to the axis of rotation of said member and being of a material having substantially unity permeability and a coercive force of sufficiently high value to maintain a preselected strength of said static field in the presence of an operating deflection yoke field.

10. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  a pair of ring-shaped magnets each receivable in said space within the interior of said yoke and disposed and rotatable about the axis of said neck, said magnets each creating a static field oriented generally transverse to their axis of rotation and being of a material having substantially unity permeability and a coercive force of substantially high value to maintain a preselected strength of said static field in the presence of an operating deflection yoke field.

11. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion, comprising:
  an assemblage, including static field producing current-conductive coil means receivable in said space substantially at said deflection center, for creating a static magnetic field oriented generally transverse to and rotatable about the axis of said neck, said coil means being of a material having substantially unity pearmeability and maintaining a preselected strength of said static field in the presence of an operating deflection yoke field;
  and means adjustably supplying current to said coil means for varying the strength of said static field.

12. A beam centering device, for use in conjunction with a cathode-ray tube having a neck a portion of which is surrounded by an electromagnetic deflection yoke of a physical shape defining a magnetic deflection center and a space of predetermined size in its interior externally of said neck portion comprising:
  a pair of assemblages, each including a static field producing current-conductive coil means receivable in said space substantially at said deflection center, for creating a pair of static magnetic fields each oriented generally transverse to and independently rotatable about the axis of said neck, said coil means being of a material having unity permeability and maintaining a preselected strength of said static field in the presence of an operating deflection yoke field;
  and means adjustably supplying current to each of said coil means for varying the strength of the respective static magnetic field.

13. A beam centering device, for use in conjunction with a cathode-ray tube having a neck a portion of which is surrounded by an electromagnetic deflection yoke assembly productive of a deflection field having a predetermined flux path and being of a physical shape defining a magnetic deflection center and a space of predetermined size located within said flux path, comprising:
    a ring shaped magnet receivable in said space substantially at said deflection center and disposed and rotatable about the axis of said neck, said magnet creating a static field oriented generally transverse to its axis of rotation and being of a material having substantially unity permeability and a coercive force of sufficiently high value to maintain a preselected strength of said static field in the presence of said deflection field.

References Cited in the file of this patent

UNITED STATES PATENTS

| | | |
|---|---|---|
| 2,646,522 | Shaw et al. | July 21, 1953 |
| 2,717,323 | Clay | Sept. 6, 1955 |
| 2,719,249 | Friend | Sept. 27, 1955 |
| 2,730,642 | Grosjean | Jan. 10, 1956 |
| 2,740,064 | Birkbeck | Mar. 27, 1956 |
| 2,795,717 | Finkelstein et al. | June 11, 1957 |